(12) United States Patent
Larsen et al.

(10) Patent No.: US 11,237,037 B2
(45) Date of Patent: Feb. 1, 2022

(54) HYDRAULIC MASS-DETERMINING UNIT AND A METHOD FOR DETERMINING THE MASS OF A LOAD USING THE SAME

(71) Applicant: GRIPTECH B.V., Valkenburg (NL)

(72) Inventors: Knud-Erik Larsen, Nexo (DK); Robert Servaas Matti, Valkenburg (NL)

(73) Assignee: GRIPTECH B.V., Valkenburg (NL)

( * ) Notice: Subject to any disclaimer, the term of this patent is extended or adjusted under 35 U.S.C. 154(b) by 0 days.

(21) Appl. No.: 17/368,491

(22) Filed: Jul. 6, 2021

(65) Prior Publication Data
US 2021/0333142 A1    Oct. 28, 2021

Related U.S. Application Data

(63) Continuation of application No. 16/483,707, filed as application No. PCT/NL2018/050081 on Feb. 6, 2018, now Pat. No. 11,085,810.

(30) Foreign Application Priority Data

Feb. 8, 2017  (DK) .............................. PA201770075
Sep. 22, 2017 (NL) .................................. 2019608.0

(51) Int. Cl.
  *G01G 5/04*      (2006.01)
  *G01G 23/01*    (2006.01)
  (Continued)

(52) U.S. Cl.
CPC .............. *G01G 5/04* (2013.01); *G01G 19/083* (2013.01); *G01G 19/10* (2013.01); *G01G 23/01* (2013.01); *B66F 17/003* (2013.01)

(58) Field of Classification Search
CPC ........ G01G 5/04; G01G 19/083; G01G 19/10; G01G 23/01; B66F 17/003
See application file for complete search history.

(56) References Cited

U.S. PATENT DOCUMENTS 5,139,101 A      8/1992  Smith
7,795,547 B2 *   9/2010  Hansen ................. B66F 9/0755
                                                      177/1
(Continued)

FOREIGN PATENT DOCUMENTS

WO        2006128454 A1   12/2006

*Primary Examiner* — Randy W Gibson
(74) *Attorney, Agent, or Firm* — Suiter Swantz pc llo

(57) ABSTRACT

A hydraulic mass-determining unit arranged for determining the mass of a load held by a hydraulic fluid system, the mass-determining unit is adapted to be connected to a hydraulic pump at a first fluid connection and a hydraulic actuator of a lifting device at a second fluid connection, the mass-determining unit comprises a first pipe arranged for connecting the first fluid connection and the second fluid connection, and at least one pressure sensor arranged to measure the pressure in the first pipe, wherein the mass-determining unit further comprises a flow regulator with a pressure compensator, where the flow regulator is serially connected to the first pipe to regulate the flow in the first pipe, and one of a pressure switch arranged for measuring the pressure difference over the flow regulator, and for sending a signal to the pressure sensor to measure the pressure in the first pipe when the pressure difference is above a preset value, or a magnetic field switch that comprises a magnet attached to the pressure compensator and a detecting unit arranged for detecting whether the magnet and the pressure compensator are in an initial position, and for sending a signal to the pressure sensor to measure the pressure in the first pipe when the detecting unit detects that the pressure compensator is not in the initial position, and a processor for based on the measured pressure in the first pipe by the pressure sensor calculating a mass of the load.

15 Claims, 4 Drawing Sheets

Figures 1A, 1B:
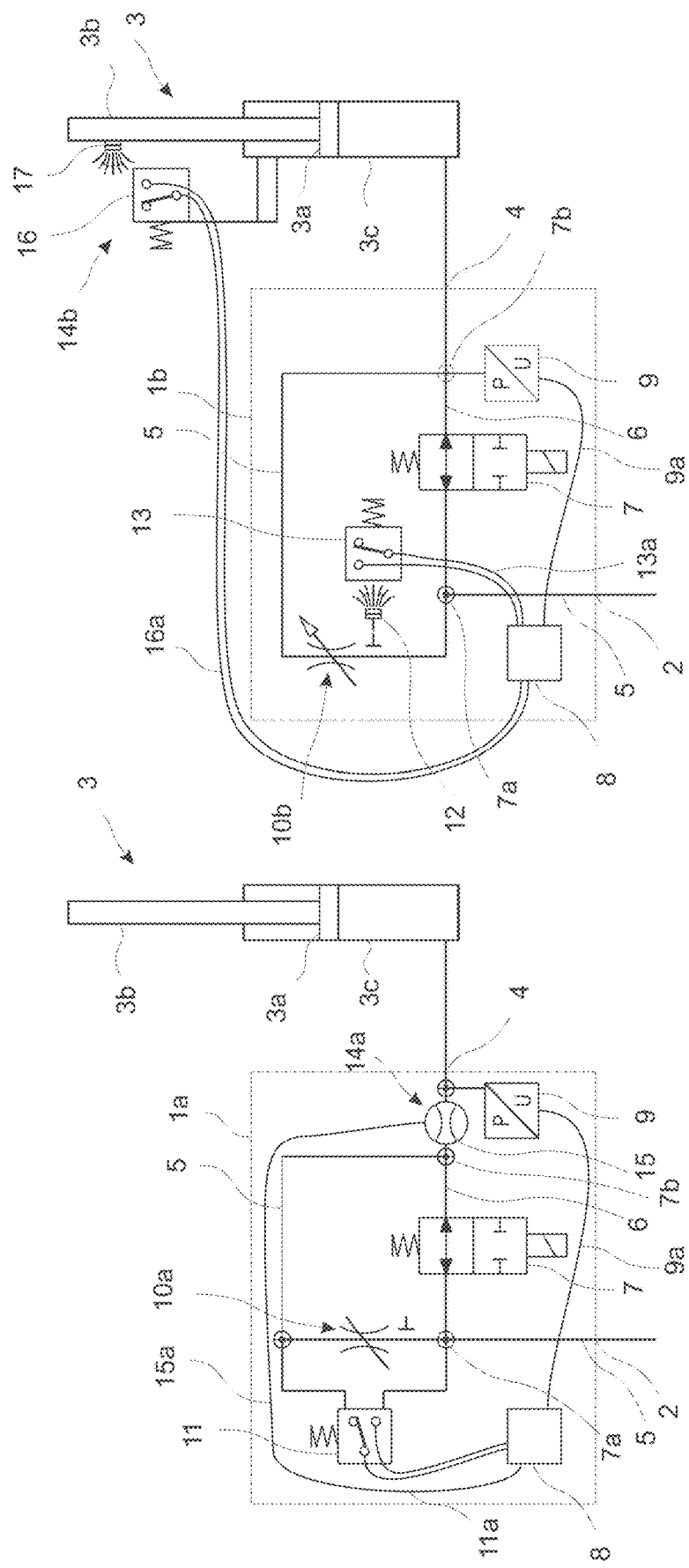

(51) Int. Cl.
*G01G 19/10* (2006.01)
*B66F 17/00* (2006.01)
*G01G 19/08* (2006.01)

(56) References Cited

U.S. PATENT DOCUMENTS

| | | |
|---|---|---|
| 2008/0314649 A1 | 12/2008 | Hansen |
| 2016/0146660 A1 | 5/2016 | Larsen |
| 2019/0145814 A1 | 5/2019 | Hansen |
| 2019/0145815 A1 | 5/2019 | Hansen |

* cited by examiner

HYDRAULIC MASS-DETERMINING UNIT AND A METHOD FOR DETERMINING THE MASS OF A LOAD USING THE SAME

The invention relates to a hydraulic mass-determining unit arranged for determining the mass of a load held by a hydraulic fluid system, the mass-determining unit is adapted to be connected to a hydraulic pump at a first fluid connection and a hydraulic actuator of a lifting device at a second fluid connection, the mass-determining unit comprises a first pipe arranged for connecting the first fluid connection and the second fluid connection, and at least one pressure sensor arranged to measure the pressure in the first pipe.

When loading the cargo compartment of a lorry it is important to know the weight of each loaded item to be able to sum up the total loaded weight and avoid overload and consequently breakdown of the lorry. To save time, it is also of great interest to determine the weight of a load positioned in or on a lifting device like e.g. a forklift during loading.

Such a system is known from EP 1893955. EP 1893955 discloses a system weight determination of a load carried by a lifter based on an upward and a downward displacement of the lifter by means of a hydraulic actuator. A position signal of the actuator is registered as a function of time, so that an acceleration dependent parameter can be determined. The weight of the load is determined on the basis of a pressure signal by a pressure gauge, the position signal, and the acceleration dependent parameter.

Since, the system presented therein cannot keep a constant and equal flow of hydraulic fluid during the measurements the system has to compensate for variations in the acceleration forces and in a pressure drop between the actuator and the pressure gauge. But the estimated or calculated pressure drop will always comprise an unknown uncertainty. This uncertainty will be especially large if the oil in the pump and tank is hot and the oil in the actuator is cold, which will be the case outdoors at winter time when the pump has been going but the actuator has been inactive. During start up, the temperature of the oil in the tank and the pump will always increase faster than the temperature of the oil in the actuator, which will also influence the accuracy of the determination of the weight of the load negatively.

In DK 2016 70282 a system is presented to determine the load when placed on the forks of a forklift, but no reliable system is presented when to perform the measurement, or under which conditions.

Another weighing system is known, where the load to be determined is placed on the forks of a forklift, and where the system is mounted parallel with the hydraulic pump, and where the load is weighed during a downward movement of the load and forks by letting the hydraulic oil flow from the actuator to the tank. Unfortunately, this system during weighing puts the inbuilt emergency shutdown function of the forklift out of order, since stopping the pump will not stop the load from descending, since the fluid can still flow through the weighing system to the tank.

The drawbacks and disadvantages of the above-mentioned prior art mass-determining units such as hydraulic mass-determining units are according to the invention remedied by, in a first aspect providing a mass-determining unit that provides an accurate determination of the mass of a load, in a second aspect providing a mass-determining unit that will determine the weight of the load within a short time, in a third aspect providing a mass-determining unit that determines the weight during the same conditions every time, in a fourth aspect providing a mass-determining unit that reduces the waste of energy during the measurements of the weight of the load, in a fifth aspect providing a mass-determining unit that provides the determination of the mass of a load during the normal transportation of the load without wasting time, and in a sixth aspect providing a mass-determining unit that saves time in the handling process, reduces the traffic, and improves the working environment.

The novel and unique features according to the invention whereby these and other aspects are achieved consist in the fact that the mass-determining unit in addition to the features mentioned in the opening paragraph further comprises a pressure compensated flow regulator with a pressure compensator, where the pressure compensated flow regulator is serially connected to the first pipe to regulate the flow in the first pipe, and one of a pressure switch arranged for measuring the pressure difference over the pressure compensated flow regulator, and for sending a signal to the pressure sensor to measure the pressure in the first pipe when the pressure difference is above a preset value, or a magnetic field switch comprising a magnet, attached to the pressure compensator, and a detecting unit arranged for detecting whether the magnet and the pressure compensator are in an initial position, and for sending a signal to the pressure sensor to measure the pressure in the first pipe when the detecting unit detects that the pressure compensator is not in the initial position, and a processor for based on the measured pressure in the first pipe by the pressure sensor calculating a mass of the load.

The hydraulic mass-determining unit according to the invention has the advantages, that during mass-determination the flow of fluid is always regulated and kept constant, thereby providing similar flow conditions including flow resistance during mass-determining and calibration measurements, so that the flow resistance during mass-determining measurements in addition to the weight of the empty lifting device can be eliminated by subtraction by the calibration measurement. The load determining process using the unit according to the invention is therefore precise, fast and efficient.

In the present application the term "fluid connection" refers to a point of a pipe, to a pipe of some length or to a hydraulic quick-release coupling.

The pressure compensated flow regulator (also called flow regulator or PCFR in this application) used in the unit according to the invention is arranged for limiting or regulating flow of fluid through itself, so that the flow is always constant and has the same velocity from time to time, which means that flow resistance during mass-determining and calibration measurements are similar and the flow resistance during mass-determining measurements can be eliminated by subtraction of the calibration measurement. The PCFR is arranged such, that the flow through the PCFR will be constant when the flow exceeds an upper limit. In this respect, the PCFR can comprise a limiting or regulating first opening and is arranged such, that the size of said opening can be adjusted/controlled. The upper limit of the flow velocity through the PCFR can be adjusted and determined by the size of the limiting or regulating first opening together with the pressure difference between the two sides of the first opening.

The PCFR can further comprise a second opening, placed in fluid series with the first opening, where the pressure compensator can be displaced within a hollow elongated volume (internal channel) with a fixed cross-section within the PCFR just in front of or behind the second opening so that the pressure compensator functions as a pressure-reducing valve of the second opening.

The purpose of the pressure compensator is to control the pressure drop over the second opening so that the pressure drop over the first opening is kept constant.

As mentioned above, the flow through the PCFR is determined by the size of the first opening, which can be controlled by e.g. the position of a needle valve placed in the first opening, and by the pressure drop over the first opening, which is controlled and kept constant by the position of the pressure compensator in relation to the second opening.

In the following is described how the pressure compensator can function for keeping the pressure drop over the first opening constant.

When the pressure compensator moves from a first position, where the fluid is more or less blocked from flowing through the second opening, to a second position, where the fluid can freely flow through the second opening, the pressure drop over the second opening will decrease. The pressure compensator can be biased by a first spring positioned on a first side of the pressure compensator for ensuring that with no or little flow of fluid through the PCFR, the pressure compensator is pressed to the second position, where the second opening is more or less totally open.

A first channel fluidly connects the downstream side of the first opening of the PCFR to the hollow elongated volume on the first side of the pressure compensator, so that the downstream side of the first opening and the first side of the pressure compensator have equal pressure. The pressure, $p_1$, acting on the first side of the pressure compensator presses on the pressure compensator on the same side and in the same direction as the spring.

A second channel fluidly connects the upstream side of the first opening to the hollow elongated volume on a second side of the pressure compensator opposite the first side, so that the upstream side of the first opening and the other second side of the pressure compensator have equal pressure. The pressure, $p_2$, acting on the second side of the pressure compensator presses on the pressure compensator on the opposite side and in the opposite direction of the first spring.

The force, $F_1$, which the first spring exerts on the pressure compensator, and the pressure difference, $\Delta p$, over the first opening, where $\Delta p = p_2 - p_1$, multiplied with the enveloping area, A, of the pressure compensator or cross-section of the elongated hollow volume, will move the pressure compensator to an equilibrium condition, where $F_1 = \Delta p * A$.

This equilibrium condition discloses that it is the first spring acting on the pressure compensator that determines the pressure drop over the first opening.

In some situations it is preferable to obtain a different equilibrium, as this will ensure another pressure drop over the first opening. Accordingly, it is advantageous to use a spring having a higher or lower spring constant in which the pressure compensator will open or close the second opening so that the pressure drop over the first opening is kept constant at a higher or lower level, which will result in a higher or lower flow velocity through the PCFR.

An increase in $p_2$ or a decrease in $p_1$ will have the effect that the pressure compensator is moved against the spring so that the spring is more compressed and closes the second opening to a certain degree, increasing the pressure difference over the second opening, so that the pressure difference, $\Delta p$, over the first opening is kept to the same as before the change of the pressure upstream or downstream the first opening.

A decrease in $p_2$ or an increase in $p_1$ will have the effect that the pressure compensator is moved so that the spring is decompressed, which opens the second opening somewhat, decreasing the pressure difference over the second opening, so that the pressure difference, $\Delta p$, over the first opening is kept to the same as before the change of the pressure upstream or downstream the first opening.

This has the advantage that the pressure compensator can compensate for variations in the pressure difference over the PCFR so that the pressure difference over the first opening is always the same or nearly the same and the flow of fluid through the PCFR is constant or nearly constant.

The actuator of a hydraulic system can be controlled by a valve that lets fluid from the pump reach the actuator when the actuator is to lift the lifting device. If the lifting device is forks of a forklift truck it is common that the actuator is lowered by using the weight of the forks or of the forks and the load to drain the actuator and press the fluid back to the reservoir of the pump. Using another lifting device the pump can pump fluid into the actuator both when lifting and lowering the actuator.

So when an applied pressure over the PCFR and an applied flow velocity through the PCFR by the pump or due to the emptying or draining of the actuator exceed the maximum pressure $$\Delta p = F_1/A \quad (1)$$

determined by the spring constant and exceed the upper limit of the flow velocity of the PCFR preferably controlled by the needle valve, the flow is limited and will be kept constant. The flow will be the same both during calibration without a load and during calibration with a load of known weight, preferably close to the maximum weight designed for the hydraulic fluid system, as well as during measuring and estimating the weight of the load to be determined. The calibration and the determination of the weight of the load are preferably done during a movement in the same direction, since the flow resistance will be the same. The movement can be a downward movement, an upward movement, or a combined upward and downward movement. In this way, the flow resistance and the weight of the empty lifting device can be subtracted, and the relationship between a measured pressure and the corresponding weight of the load can be determined to a high accuracy.

It is important that the pressure sensor measures the pressure when the flow of fluid is at the regulated value, i.e. constant value, and not at a lower flow, since at the lower flow the pressure over the first opening and the flow through the PCFR will not be limited and kept constant by the PCFR. Therefore, it is important to determine that the flow of fluid is regulated.

This can be determined by the pressure switch fluidly connected to each side of the PCFR so that the pressure difference over the PCFR, when exceeding a preset value, will switch a first switch so that the signal for indicating that the flow is regulated is sent to the pressure sensor telling the pressure sensor to measure the pressure, preferably in the first pipe. The preset value can preferably be set depending on the spring constant, i.e. the force exerted by the chosen spring. The preset value is set a little higher than the pressure corresponding to the force exerted by the chosen spring. That force, $F_1$, divided by the enveloping area, A, is the same as the pressure difference over the first opening as disclosed in equation (1).

When the pressure switch registers a pressure difference higher than the preset value and thus higher than the pressure difference over the first opening, a pressure difference over the second opening exists, which means that the pressure compensator is moved away from the second extreme position, so that the second opening is somewhat closed and the pressure compensator is in regulating mode. When the first switch of the pressure switch switches from open to closed state or from closed to open state the pressure compensator is in regulating mode. Open state means that no current can pass the switch and closed state means that current can pass the switch. The signal from the processor can then be sent through the first switch back to the processor that will send a signal to the pressure sensor to measure the pressure, preferably in the first pipe.

Instead of using the pressure switch, the magnetic field switch comprising the magnet and a second switch can be used in a second embodiment. The magnet is attached to the pressure compensator. The magnetic field switch is arranged in the PCFR to register whether the magnet and the pressure compensator are in the initial position—which means no flow or very little flow through the PCFR, where the flow is unregulated or unlimited—or the magnet and the pressure compensator are moved away from the initial second position, which means that the pressure compensator is regulating the flow and the flow is limited and kept constant. So when the magnetic field switch registers that the pressure compensator is not in the initial position, the second switch of the magnetic field switch switches so that the signal from the processor can be sent through the second switch back to the processor that will send a signal to the pressure sensor to measure the pressure, preferably in the first pipe.

The pressure sensor or the processor can have an inbuilt delay so that the signal from the pressure switch or from the magnetic field switch has to continue for at least 10 ms, at least 50 ms, at least 100 ms, preferably at least 250 ms or more preferably at least 500 ms before the pressure sensor measures the pressure or before the processor tells the pressure sensor to measure the pressure, preferably in the first pipe. The advantage is that when the pressure is measured the flow of fluid and the pressure are totally stabilised and steady.

Instead of the first switch or the second switch, the pressure switch or the magnetic field switch can have a transmitter that transmits the signal through wires and/or wirelessly when the pressure difference over the PCFR exceeds the preset value or when the magnet and the pressure compensated have left the initial position.

The detecting unit arranged for detecting whether the magnet and the pressure compensator are in an initial position can be a second magnet that is biased by a second spring. When the magnet and the pressure compensator are in an initial position the second magnet is attracted by the magnet, while when the magnet and the pressure compensator move away from the initial position the magnetic attraction between the magnet and the second magnet becomes weaker until the biased force from the second spring overcomes the magnetic attraction and pulls the second magnet from a first position of the second magnet to a second position of the second magnet further away from the magnet. This move between the first position and the second position of the second magnet will switch the magnetic field switch from open to closed state or vice versa.

Alternatively, the detecting unit arranged for detecting whether the magnet and the pressure compensator are in an initial position can be a coil arranged in the magnetic field switch and positioned to more or less enclose the magnet, when the magnet and the pressure compensator is in the initial position. When the magnet and the pressure compensator move away from the initial position, the magnet will induce a current in the coil that will be sent to and trig the pressure sensor to measure the pressure, preferably in the first pipe.

Other alternatives are also possible within the scope of the present invention.

The pressure sensor can preferably be positioned to measure the pressure in the first pipe between the PCFR and the second fluid connection, since that will provide a pressure that is very close to the pressure in the actuator. The difference between the pressure at the pressure sensor and the pressure in the actuator is subtracted away by calibrating with an empty lifting device and with the lifting device with a load of known weight.

The pressure measured by the pressure sensor will be sent to a processor that will calculate the mass of the load based on the measured pressure and as well as on calibration measurements.

The present invention provides a cost-effective mass-determining unit that can easily be fluidly connected in series to an existing hydraulic system of a fork-lift or a crane without preventing the emergency shutdown function fulfilling its object or purpose.

The mass-determining unit can comprise a second pipe parallel with the first pipe and fluidly connected to the first pipe on each side of the PCFR, where the second pipe can comprise a valve for blocking flow through the second pipe.

With the second pipe comprising a valve for blocking flow through the second pipe, the valve can be open when the weight of the load is not determined so that raising and lowering of the load can be done without any restrictions in speed.

In those cases, where the pressure is not measured in the first pipe but in the second pipe or another pipe of the mass-determining unit, the pressure should be considered to be measured in the first pipe.

The pressure sensor can be connected to and measure the pressure in the first pipe between the PCFR and the second fluid connection, or in the first pipe close to the second fluid connection.

That the pressure sensor can measure the pressure in the first pipe close to the second fluid connection means that the pressure can be measured in a point on the first pipe without anything influencing the pressure like the PCFR between that point and the second fluid connection.

That the pressure sensor can measure the pressure in the first pipe between the PCFR and the second fluid connection or close to the second fluid connection, or in the second pipe between the valve for blocking flow in the second pipe and the second fluid connection or close to the second fluid connection has the benefit that the measured pressure will correspond to the pressure at the actuator without any or with very few corrections.

There can be a pressure difference between a point close to the actuator and a point close to the PCFR or the valve for blocking flow in the second pipe, and the pressure sensor can therefore in an embodiment be positioned to measure the pressure at the actuator. But calibration with no load and with a heavy, known load will take care of the difference in pressure at the actuator and away from the actuator.

The mass-determining unit can comprise a third fluid connection and a return pipe connecting the first fluid connection and the third fluid connection, where the return pipe can comprise a pressure relief valve set to open for flow from the first fluid connection to the third fluid connection when the pressure difference between the first fluid connection and the second fluid connection exceeds a preset value, where the third fluid connection can be adapted to be connected to a tank of hydraulic fluid.

The pressure relief valve can open partly for fluid from the pump directly to the tank, when the pressure difference over the PCFR exceeds a preset value, so that a part of the fluid from the pump can return to the tank and another part of the fluid from the pump can flow through the PCFR.

With the pressure relief valve, the weight of the load can be determined during an upward movement of the load and actuator, when the pump has to lift the load, without unnecessary waste of energy.

It can be advantageous to use the pressure relief valve, when the movement of the load is upward, like e.g. a forklift loading a lorry, where the forklift is on the same level as the lorry. The measurement can be performed while lifting the load up to the floor level of the cargo compartment. In this way, overload of the lorry can easily be avoided without wasting time and energy.

The flow of fluid through the PCFR can be restricted by a bi-directional flow controller.

The bi-directional flow controller can regulate or limit the flow of the fluid in both directions so that the weight of the load can be determined in both an upward and a downward movement of the load, where all dynamic friction can be eliminated, since the flow is constant due to the PCFR, and the accuracy of the determination of the weight of the load can be even higher than when the load is determined in either an only upward or an only downward movement of the load.

Suppose a load of an unknown mass X is to be determined. In an upward movement the mass determining unit will measure a weight of $X_1=X+X_2$, where the $X_2$ is due to flow resistance in the system during the upward movement. In the downward movement the mass determining unit will measure a weight $X_3=X-X_4$, where the $X_4$ is also due to flow resistance in the system but during the downward movement. Since the upward movement and the downward movement have the same velocity, then $X_2=X_4$, and by calculating the mean value of the measured $X_1$ and $X_3$ we get the true mass X of the load.

The bi-directional flow controller can be a first bi-directional flow controller positioned, preferably in the first pipe, between a fourth fluid connection connected preferably by the first pipe to the first fluid connection and a fifth fluid connection preferably connected by the first pipe to the second fluid connection, the first bi-directional flow controller can comprise a first branch pipe with a first one-way valve, and a second branch pipe with a second one-way valve, where the first branch pipe connects the fourth and a sixth fluid connections, and where the second branch pipe connects the fifth and the sixth fluid connections, where the first one-way valve is arranged to guide or block fluid from the fourth fluid connection to the sixth fluid connection, and where the second one-way valve is arranged to guide or block fluid from the fifth fluid connection to the sixth fluid connection, a third branch pipe with a third one-way valve, and a fourth branch pipe with a fourth one-way valve, where the third branch pipe connects the seventh and the fifth fluid connections, and where the fourth branch pipe connects the seventh and the fourth fluid connections, where the third one-way valve is arranged to guide or block fluid from the seventh fluid connection to the fifth fluid connection, and where the fourth one-way valve is arranged to guide or block fluid from the seventh fluid connection to the fourth fluid connection, and the flow regulator positioned in a central pipe connecting the sixth fluid connection and the seventh fluid connection.

In this embodiment, described in other words, the PCFR can be connected centrally in a bridge construction surrounded by the four pipes—the first branch pipe, the second branch pipe, the third branch pipe, and the fourth branch pipe, each branch pipe comprising a one-way valve. The bridge construction resembles the Wheatstone bridge, where the electrical threads are replaced by pipes for guiding fluid, the PCFR has replaced the voltmeter or galvanometer and the one-way valves have replaced the resistors, where the one-way valves have the directions so that fluid always enters the PCFR the same way irrespective of whether the actuator moves upwardly or downwardly.

The flow in both directions will be the same—with the benefits that the flow resistance in the system will be the same in both directions and can easily be eliminated as mentioned above—and can be adjusted by the same PCFR.

This will be a cost-effective, reliable and accurate hydraulic mass-determining unit.

The bi-directional flow controller can be a second bi-directional flow controller positioned, preferably in the first pipe, between the fourth fluid connection and the fifth fluid connection, the second bi-directional flow controller can comprise the PCFR and a fifth one-way valve in a fifth branch pipe between the fourth fluid connection and the fifth fluid connection, where the fifth one-way valve can be arranged to guide or block fluid from the fourth fluid connection to the fifth fluid connection, and a second PCFR and a sixth one-way valve in a sixth branch pipe between the fourth fluid connection and the fifth fluid connection, where the sixth one-way valve can be arranged to guide or block fluid from the fifth fluid connection to the fourth fluid connection.

In this embodiment, described in other words, there are two parallel pipes, each pipe with a PCFR and a one-way valve, so that the fluid will flow through the one pipe in one direction and in the other pipe in the other direction.

Conventionally, when lowering the forks of a forklift, a valve is opened so that fluid in the actuator can flow back to the reservoir. It is the weight of the forks eventually combined with the weight of the load on the forks rather than the pump that force the fluid out of the actuator. The maximum speed of the actuator in the downward direction can therefore be lower than in the upward direction. To speed up the measurement, each PCFR can be adjusted individually, so that the flow of fluid in the upward direction is e.g. higher compared to the flow in the downward direction.

The hydraulic mass-determining unit according to the present invention, the hydraulic mass-determining unit can be adapted to receive a signal from a positioning component when the hydraulic actuator passes a preset position.

The positioning component can be a flow meter preferably positioned in the hydraulic mass-determining unit. Preferably, a pressure meter can measure the pressure at the position of the flow meter to take any compressibility of the fluid into account. If a calibration point and the enveloping surface of a piston of the actuator are known then the flow meter can tell the actual position of the piston and the corresponding piston rod. When the flow meter registers that a certain point is passed by the piston a third switch can be switched from open to closed state or from closed to open state, thereby telling the processor that the actuator/piston is in the position for the pressure sensor to measure the pressure in the first pipe.

Alternatively, the positioning component can comprise a third magnet attached to the piston and a magnetic switch attached to a cylinder barrel of the actuator so that the magnetic switch switches from open to close state when the piston is positioned so that the third magnet is close or just opposite the magnetic switch. In that position interval of the piston, where the third magnet is close or just opposite the magnetic switch the magnetic switch will return a signal from the processor telling the processor that the actuator/piston is in the position for the pressure sensor to measure the pressure in the first pipe.

It is an advantage that the actuator has the same position when the pressure sensor performs calibration measurements and weighing determining measurements in an upward movement and/or a downward movement of the actuator, since any variation in the flow resistance due to position of the actuator can be eliminated, and the accuracy of weighing the load can be enhanced.

The present invention also relates to a method of determining the mass of a load using the hydraulic mass-determining unit according to the invention connected to a hydraulic pump at a first fluid connection and to a hydraulic actuator at a second fluid connection wherein the method comprises the steps of placing a load, which mass is to be determined, on or in a moving unit, measuring a pressure by the pressure sensor, while moving the moving unit with the load, and determining the load of the moving unit with the load based on the measured pressure.

The moving unit can e.g. be forks of a forklift, or the moving unit can e.g. be a hook, a clamshell bucket or an excavator bucket of a hydraulic crane system.

Moving of the empty moving unit and of the moving unit with the load are preferably done in the same direction, e.g. upward or downward. Preferably, moving of the empty moving unit and of the moving unit with the load can both be done in two directions, e.g. upward and downward.

The hydraulic mass-determining unit is advantageous when measuring the load during unloading from e.g. a lorry by a forklift down to a level below the level of the cargo compartment. The measurement is performed while lowering the load from the level of the floor of the cargo compartment. In this way the weight of each unit can easily be determined with close accuracy without wasting time. Actually, the hydraulic mass-determining unit is advantageous when measuring load during all movement of load, where the main movement of the load is downward or at least there is a downward movement long enough.

The hydraulic mass-determining unit is advantageous when measuring the load during loading by a forklift unto e.g. a lorry, where the load has to lifted up to the floor level of the cargo compartment. Actually, the second hydraulic mass-determining unit is advantageous when measuring load during all movement of load, where the load is moved upward. The embodiment of the hydraulic mass-determining unit comprising the pressure relief valve is especially advantageous since this hydraulic mass-determining unit will not waste energy and time unnecessarily while lifting the load and measuring the weight of the load.

The method can preferably also comprise the steps of measuring a second pressure by the pressure sensor, while moving the moving unit without a load, and of measuring a third pressure by the pressure sensor, while moving the moving unit with a load of known mass, determining the load of the moving unit with the load based on the measured second and third pressures.

Supposing the relationship between the masses and the measured pressures are linear, according to:

$$m = k*p,$$

where m is the mass, p is the measured pressure, and k is a constant, we will with the extra two measurements, have three equations and three unknowns—the mass of the empty moving unit, the constant k, and the mass of the load to be determined, which can be solved.

In an exemplary embodiment of determining the mass of a load using the hydraulic mass-determining unit according to the present invention, the signal from the positioning component can trigger the pressure sensor to measure the pressure in the first pipe.

That the measurement of the pressure by the pressure sensor can be done at the same position of the rod of the actuator for the calibration measurements and for the weighing measurements enhances the accuracy of weighing the load.

Figure 2A:
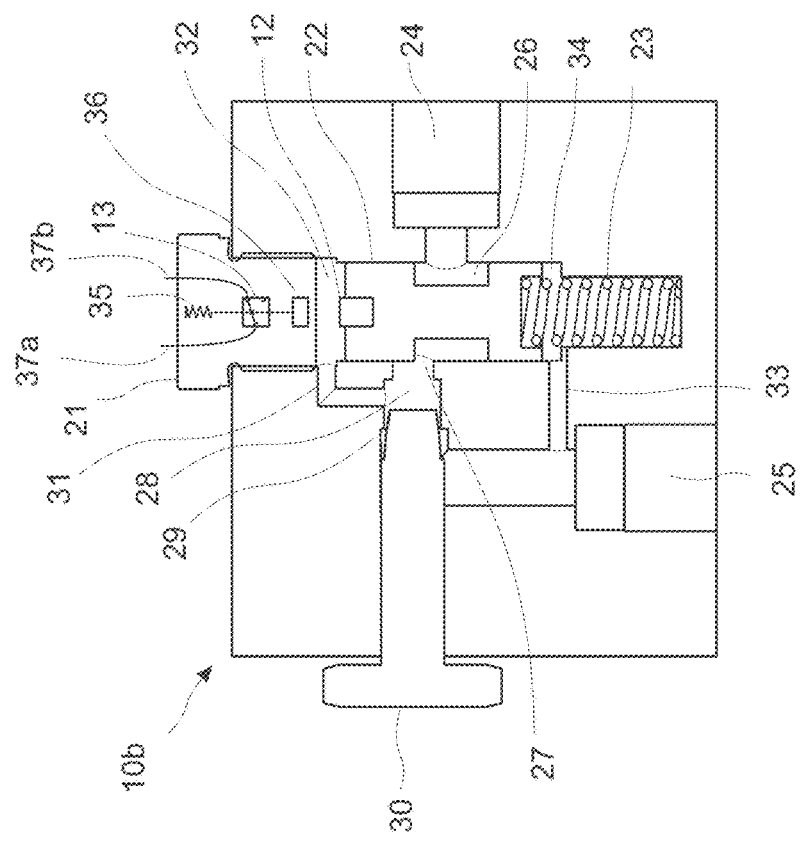
Figure 2B:
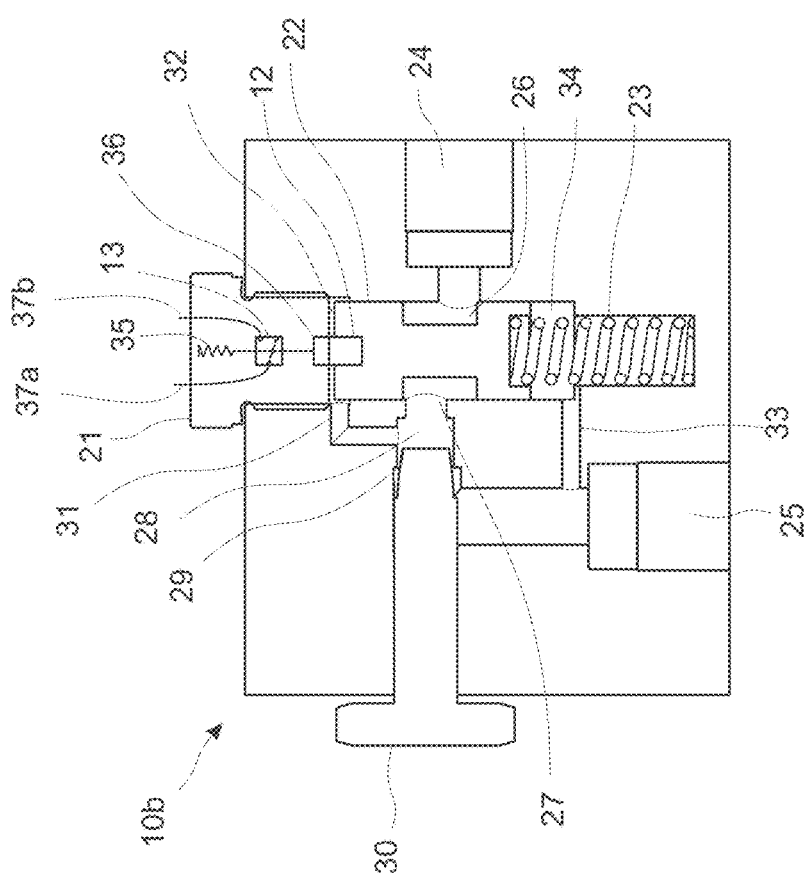
Figures 3, 4:
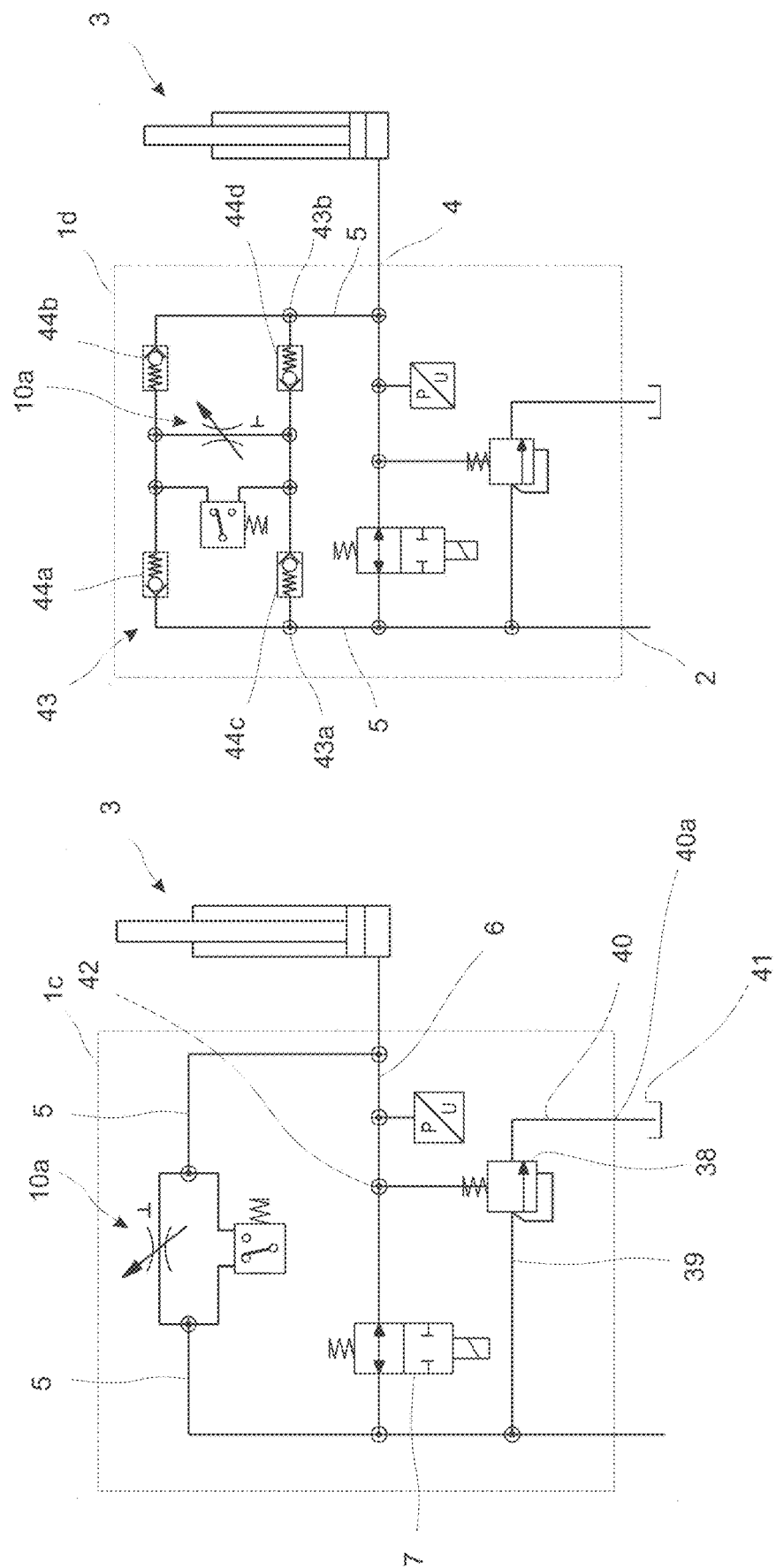

The invention will be explained in greater details below, giving further advantageous features and technical effects and describing exemplary embodiments with reference to the drawing, in which FIG. 1a shows a first embodiment of a hydraulic mass-determining unit/system, FIG. 1b shows a second embodiment of a hydraulic mass-determining unit/system, FIG. 2a shows a second pressure compensated flow regulator, where a pressure compensator is in an initial position FIG. 2b shows the second pressure compensated flow regulator, where the pressure compensator is in a regulating and non-initial position, FIG. 3 shows a third embodiment of a hydraulic mass-determining unit/system, and FIG. 4 shows a fourth embodiment of a hydraulic mass-determining unit/system.

Figure 5:
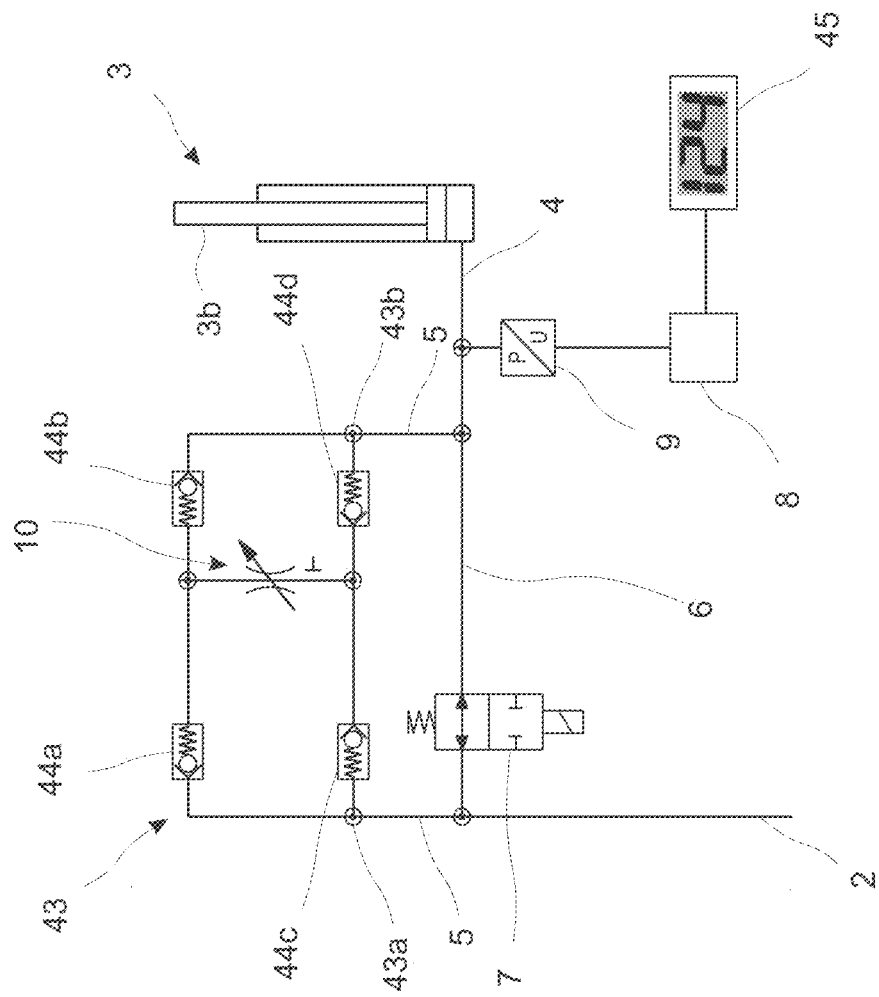

FIG. 5 shows a fifth embodiment of a hydraulic mass-determining system.

FIG. 1a shows a first embodiment of a hydraulic mass-determining unit/system 1a connected to a hydraulic pump (not shown) at a first fluid connection 2 and to a hydraulic actuator 3 with a piston 3a, a piston rod 3b and a cylinder barrel 3c at a second fluid connection 4. The pump pumps hydraulic fluid from a reservoir tank (not shown), through the first hydraulic mass-determining unit 1a and to the hydraulic actuator 3. The pump has a valve (not shown), through which fluid from the actuator 3 can be returned to the reservoir tank for lowering the piston 3a.

A first pipe 5 connects the first fluid connection 2 and the second fluid connection 4 and comprises a first pressure compensated flow regulator 10a, or first PCFR 10a for short. Parallel to the first pipe 5 there is a second pipe 6 fluidly connected to the first pipe 5 at a first interconnection 7a and a second interconnection 7b on each side of the first PCFR 10a. The second pipe 6 comprises a valve 7 for blocking flow through the second pipe 6.

During normal use of the actuator 3, when no load is to be measured and determined, the valve 7 is in its open mode and fluid can freely flow in both the first pipe 5 and the second pipe 6 between the hydraulic pump (not shown) and the hydraulic actuator 3, even though the flow through the first pipe 5 will be limited. When a load is to be measured the valve 7 is closed and the fluid will only flow through the first pipe 5. The hydraulic mass-determining unit 1a also comprises a processor 8 connected to a voltage source or battery (not shown). The processor 8 is electrically connected to a pressure sensor 9 by a first wire 9a, where the pressure sensor 9 can measure the pressure in the first pipe 5 close to the second fluid connection 4.

A pressure switch or first switch 11 is fluidly connected to each side of the first PCFR 10a for measuring a first pressure difference over the first PCFR 10a. The pressure switch 11 is connected to the processor 8 by second wires 11a. The pressure switch 11 switches from an open state to a closed state when the first pressure difference exceeds a preset value. The preset value is set so that the pressure switch 11 switches when the first PCFR 10a is limiting the flow through the first PCFR 10a. When the pressure switch 11 switches, a signal from the processor 8 is returned by the pressure switch 11 and the processor 8 is made known that the first PCFR 10a is limiting the flow.

FIG. 1b shows a second embodiment of the hydraulic mass-determining unit 1b.

The embodiment shown in FIG. 1b corresponds in general to the embodiment shown in FIG. 1a and for like parts the same reference number is used. In the second embodiment of the hydraulic mass-determining unit 1b the first pipe 5 comprises a second pressure compensated flow regulator 10b, or second PCFR 10b for short, instead of the first PCFR 10a. The second PCFR 10b comprises a first magnet 12 attached to a pressure compensator or compensator spool (not shown in this drawing), and a first magnetic switch or second switch 13. The first magnetic switch 13 switches from an open state to a closed state when the first magnet 12 and consequently also the pressure compensator move from an initial position to a regulating or limiting position. The first magnetic switch 13 is connected to the processor 8 by third wires 13a and a signal returned from the first magnetic switch 13 will tell the processor 8 that the second PCFR 10b is limiting the flow.

Thus, the differences of the first and second embodiments are the first and second PCFRs 10a, 10b, and how it is determined that the PCFR 10a, 10b is limiting the flow.

To improve the accuracy of weighing, the first 1a or second 1b hydraulic mass-determining unit has or is connected to a first 14a or a second 14b positioning component to determine when the actuator 3 or rather the piston rod 3b is in a certain position.

The first positioning component 14a shown in FIG. 1a comprises a volumetric flow meter 15 preferably positioned in the first pipe 5 and electrically connected to the processor 8 by a fourth wire 15a.

If a calibration point and the enveloping surface of the piston 3a of the actuator 3 are known then the flow meter 15 will tell the actual position of the piston rod 3b. When the flow meter 15 registers that the piston rod 3b is within a certain interval a signal is sent to the processor 8 and the signal is being sent as long as the piston rod 3b is within the certain interval.

Alternatively, the second positioning component 14b as shown in FIG. 1b comprising a second magnetic switch or a third switch 16 attached to the cylinder barrel 3c can be used. The second magnetic switch 16 is electrically connected to the processor 8 by fifth wires 16a. A third magnet 17 is attached to the piston rod 3b so that the third magnet 17 attracts a fourth magnet (not shown) in the second magnetic switch 16 and switches the second magnetic switch 16 in the interval, where the third magnet 17 is opposite the second magnetic switch 16. A signal from the processor 8 will be returned by the second magnetic switch 16, when the piston rod 3b is within the certain interval, where the third magnet 17 switches the second magnetic switch 16.

When the processor 8 registers that the pressure switch 11 or the first magnetic switch 13 has switched indicating that there is limited flow through the first PCFR 10a or the second PCFR 10b, respectively, and that the piston rod 3b is within the certain interval, where a signal is sent from the volumetric flow meter 15 or from the second magnetic switch 16, then the processor 8 will send a signal to the pressure sensor 9 to measure the pressure in the first pipe 5. Based on the measured pressure the processor will calculate the mass of the load and present the calculated mass to the driver on a display (not shown).

To avoid fluctuations in the flow during measurement of the pressure by the pressure sensor 9, the processor 8 will trig the pressure sensor 9 to measure the pressure when the pressure switch 11 or the first magnetic switch 13 has been switched for a preset time period. The preset time period can be at least 100 ms, preferably at least 250 ms or more preferably at least 500 ms.

Of course, the first PCFR 10a can be combined with the second positioning component 14b, or any other suitable positioning component, and the second PCFR 10b can be combined with the first positioning component 14a, or any other suitable positioning component.

The advantage of the first positioning component 14a is that the first positioning component can be inside the hydraulic mass-determining unit. The advantage of the second positioning component is that it is simple, cost-effective, and very reliable 14b.

The pressure sensor 9 is positioned to measure the pressure in the first pipe 5 between the first PCFR 10a or the second PCFR 10b and the second fluid connection 4 or to measure the pressure in the second pipe 6 between the valve 7 or the flow meter 15 and the second fluid connection 4.

The pressure switch 11 or the first magnetic switch 13 will only switch when there is flow of fluid through the first PCFR 10a or the second PCFR 10b, respectively. So the measurement takes place during movement of the actuator 3 and the load. The friction in the system will be dynamic friction and not static friction. It is advantageous since dynamic friction is constant from time to time if the velocity of the load is the same.

In this embodiment, the preset value of the pressure switch 11 is advantageously set to be exceeded during a downward movement of the actuator 3 and the load, or the second PCFR 10b is arranged so that the first magnet 12 is moved away from its initial position during a downward movement of the actuator 3 and the load.

During downward movement, a valve (not shown) is opened so that the fluid in the actuator 3 can flow back to the reservoir tank (not shown) through the first PCFR 10a or the second PCFR 10b without any pumping.

Since the first hydraulic mass-determining unit 1a can be installed in the first pipe 5 between the pump (not shown) and the actuator 3, the first hydraulic mass-determining unit 1a presents a very cost-effective weighing system, which during weighing does not put the inbuilt emergency shutdown function of the forklift out of order.

FIGS. 2a and 2b show one embodiment of a second PCFR 10b used in the embodiment of FIG. 1b. The first PCFR 10a has all the features of the second PCFR 10b except for the first magnet 12 and a magnetic sensor 21 comprising the first magnetic switch 13.

In FIG. 2a a pressure compensator or compensator spool 22 is in an initial position biased by a first spring 23, which means there is no or very little flow of fluid from the inlet 24 to the outlet 25 of the second PCFR 10b.

The pressure compensator 22 has a waist 26 allowing fluid from the inlet 24 and the waist 26 through a second opening 27 to reach a first cavity 28 between the second opening 27 and an adjustable orifice or first opening 29. The pressure compensator 22 is movable in a longitudinal direction of the first spring 23, so that the pressure compensator 22 limits the flow through the second opening 27. The pressure compensator 22 will limit the flow more, the further away from the first magnetic switch 13 the pressure compensator 22 is and/or the more compressed the first spring 23 is.

An adjustable screw or needle 30 is positioned in the adjustable orifice 29 to control the cross-section through which the fluid can flow. After passing the orifice 29 the fluid exits the PCFR through the outlet 25.

A third pipe 31 connects the first cavity 28 and a second cavity 32 between the pressure compensator 22 and the magnetic sensor 21, so that the pressures in the first cavity 28 and the second cavity 32, respectively, are equal or substantially equal.

A fourth pipe 33 connects the outlet 25 and a third cavity 34 surrounding the first spring 23. The third cavity 34 and the second cavity 32 are positioned on opposite sides of the pressure compensator 22. The fourth pipe 33 transfers the pressure in the first cavity 28 to the second cavity 32 keeping the pressure the same.

Acting on one side of the pressure compensator 22 are the first spring 23, which pressure upon the pressure compensator 22 is the force of the first spring 23 divided by the enveloping area of the pressure compensator 22, and the pressure in the third cavity 34, which is equal to the pressure in the outlet 25. Acting on the other side of the pressure compensator 22 is the pressure in the second cavity 32, which is equal to the pressure in the first cavity 28.

The magnetic sensor 21 comprises in addition to the first magnetic switch 13, a second spring 35 and a second magnet 36. The position of the first magnetic switch 13 is controlled by the second spring 35 and by the second magnet 36. When the pressure compensator 22 is in the initial position as in FIG. 2a the magnet or first magnet 12 attracts and keeps the second magnet 36 in a lower position. The second spring 35 is stretched out and the first magnetic switch 13 is in an open configuration. When the pressure compensator 22 and the first magnet 12 are moved away from the second magnet 36, the magnetic force attracting the first magnet 12 and the second magnet 36 to each other becomes weaker until the pulling force of the second spring 35 prevails and pulls the second magnet 36 and the first magnetic switch 13 upward so that the first magnetic switch 13 closes and creates an electrical connection between electrical wires 37a, 37b, which are part of the third wires 13a. A signal on one side of the first magnetic switch 13 can then be transferred to the other side and further to the pressure sensor 9 instructing the pressure sensor to measure the pressure.

In FIG. 2b it is shown that there is flow of fluid from the inlet 24 to the outlet 25 of the second PCFR 10b and the pressure compensator 22 is forced by the flow to a balanced, regulated position.

When the pressure compensator 22 moves from the initial position downward in the drawing of FIGS. 2a and 2b, the second opening between the waist 26 and the first cavity 28 will be reduced and finally more or less totally closed. As the second opening is reduced, a second pressure difference between the waist 26, which is the same as the pressure at the inlet 24, and the first cavity 28 increases.

As mentioned above, FIG. 2a shows the situation when there is no flow of fluid through the second PCFR 10b.

As fluid enters the inlet 24 the pressure will increase at the same time. The flow will pass the waist 26 of the pressure compensator 22 and be limited by the adjustable orifice 29 before the flow exits via the outlet 25.

The limited flow past the adjustable orifice 29 causes a drop in pressure between the first cavity 28 and outlet 25. Because of the third pipe 31 and the fourth pipe 33 the same difference in pressure exists between the second cavity 32 and the third cavity 34 and is thus acting on the pressure compensator 22. During flow of fluid past through the PCFR 10a, 10b the position of the pressure compensator 22 is determined by the pressure in the first cavity 28 on the one side and the pressure in the outlet 25 and the force of the first spring 23. So the force of the spring will correspond to the difference in pressure over the adjustable orifice 29.

The waist 26 and the pressure compensator 22 are designed in such a way that if the pressure in the inlet 24 increases, the pressure in the first cavity 28 and the second cavity 32 will also increase pushing the pressure compensator 22 downward in the drawing, increasing the pressure difference over the second opening between the waist 26 and the first cavity 28 so that the pressure in the first cavity 28 decreases and the pressure difference over the adjustable orifice 29 is adjusted back to the original value before the change.

If instead the pressure in the outlet 25 increases so will the pressure in the third cavity 34 pushing the pressure compensator 22 upward in the drawing decreasing the pressure drop at the second opening between the waist 26 and the first cavity 28, and increasing the pressure in the first cavity 28 so that the pressure drop over the adjustable orifice 29 is adjusted back to the original value before the change.

Using the principles of the first PCFR 10a and the second PCFR 10b described above in FIGS. 1a and 1b it is evident that when fluid starts flowing through the first PCFR 10a or the second PCFR 10b, the pressure compensator 22 is moved away from the initial position to the non-initial position balanced by the first spring 23 and the pressures on each side of the adjustable orifice 29.

The first spring 23 is designed or chosen to provide a certain pressure drop, $\Delta p_1$, over the adjustable orifice 29. The pressure switch 11 will then advantageously be designed or preset to switch from the open to the closed state when the first pressure difference, $\Delta p_2$, over the whole first PCFR 10a is a little above $\Delta p_1$. The preset pressure value of the pressure switch 11 should be set low enough not to exceed the total pressure drop over the first PCFR 10a.

Using the first hydraulic mass-determining unit 1a, the load can easily be measured during a downward movement of the load and actuator 3, when the fluid in the actuator just has to be drained to let the load move downward. The first PCFR 10a or the second PCFR 10b has to be positioned so that flow of fluid can be regulated when flowing from the actuator 3 through the first PCFR 10a or the second PCFR 10b to the pump.

The first hydraulic mass-determining unit 1a is advantageous when measuring the load during unloading from e.g. a lorry by a forklift, where the forklift is on the same level as the lorry. The measurement is performed while lowering the load from the floor level of the cargo compartment. In this way the weight of each unit can easily be determined with close accuracy without wasting time and using a system that is cost-effective. Actually, the first hydraulic mass-determining unit 1a is advantageous when measuring load during all movement of load, where the main movement of the load is downward or at least there is a downward movement long enough (more than 500 ms), while using a system that is cost-effective.

FIG. 3 shows a third embodiment of the hydraulic mass-determining unit $1c$—which can have all the features and advantages as the first hydraulic mass-determining unit $1a$ and/or the second hydraulic mass-determining unit $1b$ have, and for like parts the same reference number is used. The person skilled in the art will understand that the processor 8, and how the processor 8 is connected to the pressure switch 11 or the first magnetic switch 13, to the volumetric flow meter 15 or the second magnetic switch 16, and to the pressure sensor 9 are the same in the third embodiment as in the first and second embodiments but are not shown in FIG. 3.

In addition to the features of the first $1a$ and the second $1b$ hydraulic mass-determining units, the third hydraulic mass-determining unit $1c$ comprises a pressure relief valve 38 that will open for fluid when a third pressure difference between the pressure in a first point 42 on the second pipe 6 and the pressure in the fifth pipe 39 at the pressure relief valve 38 exceeds a preset value. When the pressure relief valve 38 opens for fluid, fluid can flow from a fifth pipe 39 to a sixth pipe 40 with a third fluid connection $40a$, which is fluidly connected to a tank 41 so that fluid from the pump can flow directly back to the tank 41. The tank 41 can also serve as reservoir for the pump (not shown).

Both the first PCFR $10a$ and the second PCFR $10b$ can be used in the third hydraulic mass-determining unit $1c$.

When closing the valve 7 the fluid will pass through the first PCFR $10a$, which will limit the flow. Without the pressure relief valve 38 the pump will use a lot of energy to no avail.

The pressure relief valve 38 opens partly for fluid to the tank 41 so that a part of the fluid from the pump return to the tank 41 and another part of the fluid from the pump flows through the first PCFR $10a$.

In connection with the first PCFR $10a$, the pressure relief valve 38 starts to open for fluid to the tank 41 when the third pressure difference is above or just above the first pressure difference, $\Delta p_2$. The pressure relief valve 38 cannot open so much that the third pressure difference drops below $\Delta p_2$.

With the pressure relief valve 38, the weight can be determined during an upward movement of the load and actuator 3, when the pump has to lift the load, without unnecessary waste of energy. The first PCFR $10a$ has to be positioned so that flow of fluid can be regulated when flowing from the pump through the first PCFR $10a$ to the actuator 3. Compared to the first hydraulic mass-determining unit $1a$, the first PCFR $10a$ is turned around.

The third hydraulic mass-determining unit $1c$ is advantageous when measuring the load during loading by a forklift unto e.g. a lorry, where the forklift is on the same level as the lorry and the load is lifted from the ground up to the floor level of the cargo compartment of the lorry. So the measurement can be performed while loading the lorry without unnecessary wasting energy and time. Actually, the third hydraulic mass-determining unit $1c$ is advantageous when measuring load during all movement of load, where the load is moved upward, since no unnecessary wasting of energy and time will take place.

In this way, overload of the lorry can easily be avoided without wasting time and energy.

An example will illustrate the amount of energy that can be saved. A normal pump can deliver a pressure of around 200 bar and a pumping speed of 30 l/min. With the first spring 23 chosen to correspond to a pressure of 10 bar and the adjustable orifice 29 set to 10 l/min, the wasted power will be $$P_1 = \text{maximum pressure} \ast \text{excess amount of flow} = 200 \text{ bar} \ast 20 \text{ l/min} \approx 6.7 \text{ kW}$$

Let the pressure relief valve 38 open for fluid to the tank 41 when the third difference pressure is 15 bar. The wasted power will be $$P_2 = 15 \text{ bar} \ast 20 \text{ l/min} = 0.5 \text{ kW}$$

In this example the percentage of saved power or energy exceeds 92%.

By measuring the system without a load and with a load of known mass close to the maximum limit of the system (heavy known load), the first $1a$ hydraulic mass-determining unit is calibrated and the mass of the load can be determined to an accuracy of 0.25-0.50% of the true mass of the load.

FIG. 4 shows a fourth embodiment of the hydraulic mass-determining unit $1d$—which can have all the features and advantages as the first $1a$, the second $1b$, and the third $1c$ hydraulic mass-determining units have.

The processor 8 and how the processor 8 is connected to the pressure switch 11 or the first magnetic switch 13, to the volumetric flow meter 15 or the second magnetic switch 16, and to the pressure sensor 9 are the same in the fourth embodiment as in the first and second embodiments but are not shown in FIG. 4.

In the fourth hydraulic mass-determining unit $1d$, the first PCFR $10a$ together with the pressure switch 11 are positioned in a bridge construction or bi-directional flow controller 43 between a fourth fluid connection $43a$ connected by the first pipe 5 to the first fluid connection 2 and a fifth fluid connection $43b$ connected by the first pipe 5 to the second fluid connection 4. The bridge construction 43 comprises four one-way valves $44a$-$d$. The one-way valves $44a$ and $44d$ are directed so that fluid can flow from left to right through the one-way valves $44a$ and $44d$ but not from right to left, while the one-way valves $44b$ and $44c$ are directed so that fluid can flow from right to left through the one-way valves $44b$ and $44c$ but not from left to right. The one-way valves $44a$-$d$ are arranged so that the flow of fluid has the same direction through the first PCFR $10a$ irrespective of whether the actuator 3 moves up or down.

To measure the weight of the load in both an upward movement and a downward movement increases the accuracy, since the dynamic friction of the system is eliminated. By measuring the system without a load and with a load of known mass close to the maximum limit of the system, the fourth hydraulic mass-determining unit $1d$ is calibrated and the mass of the load can be determined to an accuracy of 0.10% of the true mass of the load.

As mentioned above, the third embodiment shown in FIG. 3 can be modified in that the second PCFR $10b$ replaces the first PCFR $10a$. The fourth embodiment shown in FIG. 4 can also be modified in that the second PCFR $10b$ can be positioned in the bridge construction 43 instead of the first PCFR $10a$.

Regarding the modification of the third embodiment, the pressure relief valve 38 starts to open for fluid to the tank 41 when the third pressure difference is above or just above a fourth pressure difference corresponding to force of the first spring 23, when the first spring 23 is in the limiting mode, divided by the enveloping surface of the pressure compensator 22. The pressure relief valve 38 should not open so much that the third pressure difference drops below the fourth pressure difference. The second hydraulic mass-determining units 1*b* with the pressure relief valve 38 can determine the true mass of the load to the same accuracy and have all the advantages mentioned above as the first hydraulic mass-determining units 1*a* with the pressure relief valve 38.

Regarding the modification of the fourth embodiment, the fourth hydraulic mass-determining unit 1*d* with the second PCFR 10*b* will function just the same as with the first PCFR 10*a* and with the same advantages.

FIG. 5 shows a fifth embodiment of a hydraulic mass-determining system, where said hydraulic mass determining system connected between the lifting device or hydraulic actuator 3, and the hydraulic pump (not shown). The fifth embodiment corresponds in principal to the fourth embodiment shown in FIG. 4, and for like parts the same reference number is used. For the sake of completeness the system in FIG. 5 will comprise a control valve (not shown) connecting the hydraulic pump to the first fluid connection 2. The control valve will in an open position allow fluid from a tank (not shown) to enter the fluid system, by means of the hydraulic pump and either raise the hydraulic actuator 3 in a first position, or in another position to drain fluid from the hydraulic actuator into the tank (not shown) so that the hydraulic actuator 3 is lowered.

Most of time, the hydraulic mass determining system is not used, and the valve 7 is in the position shown to allow fluid from the hydraulic pump to flow through the second pipe 6 without restriction.

In order to use the hydraulic mass determining system the valve 7 is moved to a measuring mode by blocking passage through the second pipe 6, thereby forcing fluid to pass through the first pipe 5.

The first pipe comprises the bi-directional flow controller 43 with the PCFR 10 positioned in a bridge construction, comprising the four one-way valves 44*a-d*. The one-way valves 44*a-d* are arranged in the same way as in FIG. 4 so that the fluid always will flow through the PCFR 10 in the same direction irrespective of whether the fluid flows from or to the hydraulic actuator 3 when the valve 7 is in the measuring mode.

When the flow is high enough, the PCFR 10 will restrict the flow and keep the flow constant, and since the flow has the same direction through the PCFR 10 the flow will be the same irrespective of whether hydraulic actuator 3 is lowered or raised.

The processor 8 may request the pressure sensor 9 to measure the pressure in the hydraulic fluid system close to the hydraulic actuator or the second fluid connection 4. The pressure sensor 9 will send a signal corresponding to the measured pressure to the processor 8.

The PCFR 10 can be the first PCFR 10*a* with the pressure switch or first switch 11 as shown in FIG. 1*a*, or the PCFR 10 can be the second PCFR 10*b* with the first magnet 12 attached to the pressure compensator or compensator spool, and the first magnetic switch or second switch 13 as shown in FIG. 1*b*. The first switch 11 or the second switch 13 will send a signal to the processor that the PCFR 10*a,b* is restricting the flow so that the flow is constant. The signal from the first switch 11 or the second switch 13 will trigger the processor to have the pressure sensor to measure the pressure.

The pressure measured by the pressure sensor 9 will be influenced by the mass of the load and by the friction due to the movement of the fluid and the piston rod 3*b*.

The pressure due to the mass of the load will be the same irrespective of the moving direction of the hydraulic actuator 3.

The friction is always directed in the opposite direction of the moving direction. When the hydraulic actuator 3 is raised the frictional force and the gravitational force of the load will point in the same direction and the measured pressure by the pressure sensor will correspond to the sum of the two forces. When the hydraulic actuator 3 is lowered the frictional force and the gravitational force of the load will point in opposite directions and the measured pressure by the pressure sensor will correspond to the gravitational force of the load subtracted by frictional force.

The mean value of the pressure when raising and when lowering the hydraulic actuator 3 will balance out or eliminate the influence of the frictional force, and the calculated mean pressure will correspond to only the mass of the load. The processor will present the calculated mass to the user on a display 45. The processor 8, the pressure sensor 9, and the display 45 can be integrated in a single unit or be separate units if desired.

The difference in pressure when raising and when lowering the hydraulic actuator 3 is used to determine that the movements actually were in opposite directions. The processor can compare the difference in the two measured pressures with a preset value that is set individually for each system and will depend on the fluid friction in the hydraulic fluid system, which means that the difference will depend on e.g. the diameters, lengths, and the number of bends of the pipes of the hydraulic fluid system.

The difference between two pressures will be more or less the same irrespective of the mass of the load, as long as the measured two pressures correspond to movements in opposite directions. So even when there is no load on the lifting device, the difference between two measured pressures during two movements in opposite directions will be bigger than the preset value.

The hydraulic mass determining system has a simple and inexpensive design, and can therefore be used for both large and small load measuring equipments, where known hydraulic mass determining system are too troublesome and complicated to use.

Modifications and combinations of the above principles and designs are foreseen within the scope of the present invention.

Novel and unique features can be achieved with a hydraulic mass determining system as defined by the features of clause 1 below.

When moving the lifting device with the load at a constant speed there are three forces that influence the measured pressure measured by the pressure sensor: the gravity force of the load, the gravity force of the lifting device and the friction force during the displacement of the lifting device. The directions of the gravity forces of the load and of the gravity force of the lifting device are always downward while the friction force is pointing in the opposite direction of the moving direction of the hydraulic actuator.

By measuring the pressure during two different displacements of the lifting device, and comparing the provided values, it can be determined whether the lifting device moved in opposite directions or not during the two different displacements without the need of extra devices or sensors. If the provided values are the same or substantially the same the movements were in the same direction but if the provided values differ the difference is due to different direction of the frictional force and it can be concluded that the directions of the two movements were opposite.

The mass of the load can be measured if the mean value of the two pressure signals, also called measurements, provided values or pressure values, differ more than a preset value. Said preset value should preferably be bigger than the small differences in the measured pressure from one measurement to another measurement when the moving direction is the same, but should preferably be smaller than the difference due to different directions of the frictional force when the moving directions are opposite. Said preset value will further depend on the dimensions of the hydraulic fluid system like the lengths and diameters of the pipes.

Two different hydraulic fluid systems will need different preset values, but a preset value suitable for a specific hydraulic fluid system can easily be determined by comparing how much the pressure varies from time to time when moving the lifting device in different directions.

So when the system has compared the two measured pressure signals and if the comparison reveals that the difference in pressure exceeds the preset value, the processor will calculate the mean value of the two pressure values. The influence by the friction force on the calculated value will be eliminated. Consequently, the result of the mass determination may be substantially independent of friction force and therefore more precise. At the same time the calculated mass is reliably accurate, since no mass is calculated if the moving directions are not opposite.

To determine the mass of the lifting device without any load, the processor can be arranged for measuring the pressure by the pressure sensor two times, where the moving direction of the empty lifting device during the two measurements are opposite. The mass of the load on the lifting device can be determined by subtracting the mass of the empty lifting device from the mass of the lifting device with the load. It is preferred that the system is calibrated before use, i.e. the processor is arranged for automatically subtracting the mass of the empty lifting device for the mass of the load during use of the hydraulic mass determining system.

The correspondence between the measured pressure and the mass of the load can be determined by placing a load of known weight on the lifting device and assuming a linear relationship between the measured pressure and the mass of the load.

The processor can be any electronic item that is able to receive data about the pressure from the pressure sensor, to compare at least two data, to calculate a mass based on the data about the pressure, and to present the calculated mass on a display for the user to read. Such processors are well known in the art, and will not be discussed in further details in this application.

The hydraulic mass determining system is arranged for sending signals between the pressure sensor and the processor. Said signals can be sent via any suitable connections, e.g. wired or wireless, where information about the pressure in the fluid system can be sent from the pressure sensor to the processor. The processor and the pressure sensor can furthermore be the same unit, e.g. an integrated unit, but they may also be separate units.

The hydraulic fluid system between the hydraulic activator and the lifting device can e.g. be a pipe or a tube able to transport fluid between the hydraulic activator and the lifting device.

In order to provide a simple and inexpensive system, the hydraulic activator can be a hydraulic pump or any other source that can provide hydraulic fluid.

Hence, it is possible to provide a cost-effective mass-determining system that can easily be fluidly connected in series to an existing hydraulic system of a forklift or a crane in such a way that the emergency shutdown function is not prevented from fulfilling its object or purpose.

In an embodiment of the mass-determining system, the processor can be arranged for comparing two pressure signals from the pressure sensor corresponding to a first measurement of a first movement and a second measurement of a second movement, respectively, and for calculating the mass of the load based on the mean value of the two pressure signals, only if the two pressure signals differ more than a preset value.

By only calculating the mass of the load when the processor has determined that the two pressure signals differ more than a preset value, which corresponds to that the moving direction of the lifting device are opposite during the two measurements, the mass-determining system can determine the mass of the load where it is certain that the friction force is eliminated from the calculated mass of the load without the need of any extra means in addition to the processor and the pressure sensor. No flowmeter or position sensors or similar extra means to determine the direction of the movement is necessary. This system will be very cost effective, easy to operate and there will be at least one item less that can break.

In an embodiment of the mass-determining system, the processor can be arranged for interrupting the determination of the mass of the load if the two pressure signals do not differ more than a preset value.

That the determination of the mass of the load can be interrupted has the advantage that the user immediately will note that the system cannot provide an accurate determination of the mass of the load. The user can then make another attempt to determine the mass of the load without having wasted much time.

In order to provide a simple and inexpensive system the lifting device of the mass-determining system may comprise a single acting lifting cylinder.

A single acting cylinder is a cylinder, where the fluid is acting on only one side of the piston inside the cylinder. To push the piston in one direction, fluid is let into the cylinder, and fluid is retracted or drained from the cylinder to cause the piston to move in the other direction. With a single acting cylinder there will only be one pipe, where the fluid can enter and leave the cylinder. The pressure acting on the piston in the cylinder will be transferred to the pipe and can therefore be measured by a pressure sensor in the pipe as described above. The pressure sensor of the mass-determining system can easily be mounted to the pipe and will be able to measure the pressure acting on the piston.

That the cylinder is a lifting cylinder means that the displacement direction of the load displaced by the hydraulic fluid system is vertical or substantially vertical. The vertical or substantially vertical displacement has the advantage that the lifting device with or without the load can be lowered by draining the cylinder. The only force acting on the piston is the gravitational force of the mass of the load and of the lifting device.

In an embodiment of the mass-determining system, the hydraulic mass-determining system can comprise a bi-directional flow controller for regulating the flow of a fluid through the mass-determining system at a constant speed.

The bi-directional flow controller can comprise a pressure compensated flow regulator with a pressure compensator positioned in a fluid network so that the fluid is always passing through the pressure compensated flow regulator in the same direction. This will provide a simple and inexpensive system, in which the fluid flow is restricted at a constant flow rate irrespective of whether the lifting device is raised or lowered.

The mass-determining system can comprise a pressure compensated flow regulator with a pressure compensator, where the pressure compensated flow regulator is connected between the hydraulic activator and the lifting device to regulate the flow between the hydraulic activator and the lifting device, and one of a pressure switch arranged for measuring the pressure difference over the pressure compensated flow regulator, and for sending a signal to the pressure sensor to measure the pressure when the pressure difference is above a preset value, or a magnetic field switch comprising a magnet, attached to the pressure compensator, and a detecting system arranged for detecting whether the magnet and the pressure compensator are in an initial position, and for sending a signal to the pressure sensor to measure the pressure when the detecting system detects that the pressure compensator is not in the initial position, and a processor for based on the measured pressure by the pressure sensor calculating a mass of the load.

In an embodiment of the mass-determining system, the bi-directional flow controller can be positioned between the hydraulic activator and the pressure sensor.

With this position, the bi-directional flow controller can limit the flow of a fluid through the mass-determining system at a constant speed and at the same time the pressure sensor can measure a pressure that will be or will at least substantially be the pressure of the fluid in the lifting device or on in the cylinder.

In an embodiment of the mass-determining system, a first and a second pipe can be mounted between the hydraulic activator and the lifting device, whereby the second pipe is parallel with the first pipe, where the first pipe comprises the bi-directional flow controller, and where the second pipe comprises a valve for blocking the flow through the second pipe when determining the mass of the load.

The ends of the second pipe can be fluidly connected to and communicating with the ends of the first pipe.

The valve of the second pipe blocks flow through the second pipe when determining the mass of the load thereby forcing the fluid to pass through the PCFR in the first pipe. When the weight of the load is not determined the valve is open, so that raising and lowering of the load can be done without any restrictions in speed and accordingly without wasting energy.

In an embodiment of the mass-determining system, the at least one pressure sensor can be connected to the first pipe between the bi-directional flow controller and the lifting device.

With this position, the bi-directional flow controller can limit the flow of a fluid through the mass-determining system at a constant speed and at the same time the pressure sensor can measure a pressure that will be or will at least substantially be the pressure of the fluid in the lifting device or on in the cylinder.

There can be a pressure difference between a point close to the actuator and a point close to the PCFR or the valve for blocking flow in the second pipe, and the pressure sensor can therefore in an embodiment be positioned to measure the pressure at the lifting device.

The difference between the pressure at the pressure sensor and the pressure in the lifting device can be subtracted away by calibrating with an empty lifting device and with the lifting device with a load of known weight.

The pressure measured by the pressure sensor can be sent to a processor that will calculate the mass of the load based on the measured pressure and as well as on calibration measurements.

In those cases, where the pressure is not measured in the first pipe but in the second pipe or another pipe of the mass-determining system, the pressure should be considered to be measured in the first pipe.

In an embodiment of the mass-determining system, the mass of the load can be determined by equation (2)

$$m = \frac{A((p_1 + p_2) - (p_{01} + p_{02}))}{2g} \quad (2)$$

where g is the standard gravity 9.81 m/s², A is the cross-sectional surface area of the piston in the single acting lifting cylinder, p1 and p2 are the two pressure signals with the load on the lifting device, and p01 and p02 are the two pressure signals or measurements with the empty lifting device.

This shows how easily the mass can be determined when regulating the flow of a fluid through the mass-determining system at a constant speed using e.g. a bi-directional flow controller. Only the cross-sectional inner area of the cylinder, which is the same as the cross-sectional area of the piston of the cylinder, and the pressures during two movements in opposite directions of the lifting device with and without the load is necessary.

If the lifting device comprises chains so that the ratio between the stroke of the cylinder and lifted distance of the load is less than one, equation (2) has been adjusted by a factor. If e.g. the ratio is ½ so that the load is lifted twice the distance of the stroke of the cylinder, equation (2) should be $$m = \frac{1}{2} \frac{A((p_1 + p_2) - (p_{01} + p_{02}))}{2g} \quad (3)$$

It will be understood that once the relevant data either can be incorporated in the system e.g. as part of the processor, when the system is obtained, or the system can be arranged for easily adding the required information into said system. After the relevant information has been added and the system has been calibrated, the system will be ready to be used without any further modifications or adjustments, as all relevant data is part of the system.

In an embodiment of the mass-determining system, a tilt-sensor or an inclinometer can be connected to the processor and is arranged for measuring a tilt angle of the lifting device and for sending a tilt angle signal to the processor enabling the processor to compensate for the tilt angle when calculating the mass of the load.

If the lifting device does not move and/or does not displace the load in the vertical direction the pressure in the cylinder will not correspond to the gravitational force acting on the load and/or the moving part of the lifting device. If the tilt creates an angle—to the vertical direction the measured pressure will correspond to a force of $$F = G \cos \alpha$$

Using a tilt-sensor like e.g. the AccuStar®-EA Electronic Clinometer by TE Connectivity, Switzerland, the angle can be determined and the measured pressure compensated to correspond to the gravitational force. So even when the load is lifted in a non-vertical direction the mass of the load can be determined at high degree of accuracy.

In an embodiment of the mass-determining system, the hydraulic mass-determining system can be arranged for receiving a signal from a positioning component when the lifting device or the single acting lifting cylinder passes a preset position.

It is advantageous to calculate the mass of the load based on two measurements of the pressure during two movements of the lifting device in opposite directions. When moving the load and of the lifting device in a more or less upward direction the pressure force corresponding to the pressure measured by pressure sensor will be the friction force added to the gravity of the load and of the lifting device. When moving the load and of the lifting device in the opposite direction, which will be a more or less downward direction the pressure force corresponding to the pressure measured by pressure sensor will be the friction force subtracted from the gravity of the load and of the lifting device. In the means value of the two measurements the influence of the frictional force is eliminated.

A method that determines whether to calculate the mass of the load based on the mean value of the first and the second output signals, when the first and the second output signals differ more than a preset value is a cost-effective method that will not require any extra equipment of e.g. a lifting fork besides the processor and the pressure sensor.

There may be other ways to determine that the first moving direction and the second moving direction are opposite.

Two inductive sensors or two switches can be used, where the sensors or switches are e.g. mounted close to the piston rod of the hydraulic actuator so that the one sensor/switch detects when the piston rod passes a certain position and the other sensor/switch detects when the piston rod passes another certain position. The direction can then be determined based on which sensor is activated first. The measurement can be carried out when both sensors are activated. It is furthermore preferred that the speed is stable and/or constant.

The direction determining means can be a distance laser meter or similar e.g. positioned on the actuator or its cylinder barrel and measuring the distance to the end of the piston rod. In this way it can be determined whether the actuator is extending, retracting or standing still.

Alternatively, calculating the mass of the load based on the mean value of the first and the second output signals, is done only if the first and the second output signals differ more than a preset value, or the first moving direction and the second moving direction are opposite.

By only calculating the mass of the load when the moving directions of the lifting device are opposite during the two measurements, it can be made certain that the influence of the friction forces is eliminated from the calculated mass of the load, thereby ensuring a more precise measurement of the load than hitherto known.

The moving part of the lifting device that influences the pressure measured by the pressure sensor will cause the calculated mass of the load to be above the real mass of the load. If the mass of this moving part of the lifting device is known the mass of this moving part of the lifting device can be subtracted from the calculated mass of the load so that a more exact value of the mass of the load is provided.

In an embodiment of the method the method can comprise the step of calculating the mass of the load based on the mean value of the first and the second output signals, if the first and the second output signals differ more than a preset value.

When only calculating the mass of the load if the first and the second output signals differ more than a preset value, a safe and cost-effective method is achieved, where it is certain that the calculation of the mass of the load based on the mean value of the two first and the second output signals results in a determination of the mass of the load, where the friction forces are eliminated.

In order to ensure that the mass of the load can be calculated precisely and effectively, the method may in a further embodiment comprise the steps of measuring a first empty pressure by the pressure sensor, during a first empty movement of the lifting device without the load, creating a first empty output signal, measuring a second empty pressure by the pressure sensor, during a second empty movement of the lifting device without the load, creating a second empty output signal, comparing the first and the second empty output signals, calculating the mass of the lifting device without the load based on the mean value of the first and the second empty output signals, if the first and the second empty output signals differ more than a second preset value, and calculating a second mass of the load by subtracting the mass of the lifting device without the load from the mass of the load including the mass of the lifting device.

By measuring the mass of the empty lifting device and subtracting that mass from the mass of the lifting device with the load, the mass of the load can be determined very close to the exact value.

In another embodiment, the method may further comprise the steps of sending a first signal from a first positioning sensor or component to the processor when the lifting device passes a first preset position prior to the measurement of the first pressure or the first empty pressure, and sending a second signal from a second positioning sensor or component to the processor when the lifting device passes a second preset position prior to the measurement of the second pressure or the second empty pressure.

The first positioning sensor and the second positioning sensor may in a preferred embodiment be the same positioning sensor, as this will provide a simple and inexpensive construction.

The first preset position and the second preset position is preferably the same preset position, since then the situation in flow and the mass of the lifting device will be the same. The flow and the friction caused by the flow as well as the mass of the lifting device can vary depending on the position of the lifting device. If e.g. the lifting device is provided with a chain to displace the load e.g. the double distance compared to the displacement of the piston of the hydraulic cylinder, the chain will move during displacement and the influence of the chain on the measured pressure by the pressure sensor will vary depending on the position of the lifting device.

The hydraulic system may be adapted to be connected to a hydraulic pump at a first fluid connection and a hydraulic actuator of a lifting device at a second fluid connection, the hydraulic system comprises a first pipe arranged for connecting the first fluid connection and the second fluid connection, where the hydraulic system comprises a pressure compensated flow regulator with a pressure compensator, where the pressure compensated flow regulator is serially connected to the first pipe to regulate the flow in the first pipe, and a third fluid connection and a return pipe connecting the first fluid connection and the third fluid connection, where the return pipe comprises a pressure relief valve set to open for flow from the first fluid connection to the third fluid connection when the pressure difference between the first fluid connection and the second fluid connection exceeds a preset value, where the third fluid connection is adapted to be connected to a tank of hydraulic fluid.

The pressure relief valve can open partly for fluid from the pump directly to the tank, when the pressure difference over the PCFR exceeds a preset value, so that a part of the fluid from the pump can return to the tank and another part of the fluid from the pump can flow through the PCFR.

With the pressure relief valve, the weight of the load can be determined during an upward movement of the load and actuator, when the pump has to lift the load, without unnecessary waste of energy.

In an embodiment the hydraulic system can be a hydraulic mass-determining system arranged for determining the mass of a load held by a hydraulic fluid system, the hydraulic mass-determining system can comprise at least one pressure sensor arranged for measuring the pressure in the first pipe and for providing for each measurement an output signal.

The hydraulic mass determining system arranged for determining the mass of a load displaced by a hydraulic fluid system, whereby the hydraulic mass-determining system is adapted to be connected to a hydraulic fluid system between a hydraulic activator and a lifting device, the hydraulic mass determining system comprises at least one pressure sensor (9) for measuring the pressure in the hydraulic fluid system, where the at least one pressure sensor is connected to a processor (8), wherein the processor (8) is arranged for comparing two pressure signals from the pressure sensor (9) corresponding to a first measurement of a first movement and a second measurement of a second movement, respectively, and for calculating the mass of the load based on the mean value of the two pressure signals, if the two pressure signals differ more than a preset value.

Clauses:
1. A hydraulic mass determining system arranged for determining the mass of a load displaced by a hydraulic fluid system, whereby the hydraulic mass-determining system is adapted to be connected to a hydraulic fluid system between a hydraulic activator and a lifting device, the hydraulic mass determining system comprises at least one pressure sensor (9) for measuring the pressure in the hydraulic fluid system, where the at least one pressure sensor is connected to a processor (8), wherein the processor (8) is arranged for comparing two pressure signals from the pressure sensor (9) corresponding to a first measurement of a first movement and a second measurement of a second movement, respectively, and for calculating the mass of the load based on the mean value of the two pressure signals, if the value of the two pressure signals differ more than a preset value.
2. A hydraulic mass-determining system according to clause 1, wherein the processor (8) is arranged for interrupting the mass determination of the load if the two pressure signals do not differ more than a preset value.
3. A hydraulic mass-determining system according to clause 1 or 2, characterised in that, the lifting device comprises at least one single acting lifting cylinder (3).
4. A hydraulic mass-determining system according to any of the clauses 1 to 3, wherein hydraulic mass-determining system comprises a bi-directional flow controller (43) for regulating the flow of a fluid through the mass-determining system at a constant speed.
5. A hydraulic mass-determining system according to clause 4, wherein the bi-directional flow controller (43) is positioned between the hydraulic activator and the pressure sensor (9).
6. A hydraulic mass-determining system according to clause 4 or 5, wherein a first (5) and a second (6) pipe are mounted between the hydraulic activator and the lifting device, whereby the second pipe (6) is parallel with the first pipe (5), where the first pipe comprises the bi-directional flow controller (43), and where the second pipe comprises a valve (7) for blocking the flow through the second pipe when determining the mass of the load.
7. A hydraulic mass-determining system according to any of the clauses 4 to 6, wherein the at least one pressure sensor (9) is connected to the first pipe (5) between the bi-directional flow controller (43) and the lifting device.
8. A hydraulic mass-determining system according to any of the clauses 3 to 7 wherein the processor (8) is arranged for determining the mass of the load using the formula $$m = \frac{A((p_1 + p_2) - (p_{01} + p_{02}))}{2g}$$

where g is the standard gravity 9.81 m/s$^2$,
A is the cross-sectional surface area of the piston (3a) in the single acting lifting cylinder (3),
p1 and p2 are the two pressure signals with the load on the lifting device, and
p01 and p02 are the two pressure signals with the empty lifting device.
9. A hydraulic mass-determining system according to any of the clauses 1 to 8, wherein a tilt-sensor is connected to the processor (8) and is arranged for measuring a tilt angle of the lifting device and for sending a tilt angle signal to the processor enabling the processor to compensate for the tilt angle when calculating the mass of the load.
10. A hydraulic mass-determining system according to any of the clauses 1 to 9 wherein the hydraulic mass-determining system is arranged for receiving a signal from a positioning component (14a, 14b) when the lifting device passes a preset position.
11. A method for determining the mass of a load using the hydraulic mass-determining system according to any of the clauses 1 to 10 and wherein said hydraulic mass-determining system is connected to a hydraulic fluid system between a hydraulic activator and a lifting device wherein the method comprises the steps of
placing a load, which mass is to be determined, on or in the lifting device,
measuring a first pressure by the pressure sensor (9), during a first movement of the lifting device with the load creating a first output signal,
measuring a second pressure by the pressure sensor (9), during a second movement of the lifting device with the load creating a second output signal,
comparing the first and the second output signals, and
calculating the mass of the load based on the mean value of the first and the second output signals, if the first and the second output signals differ more than a preset value.
12. A method according to clause 11 wherein the method comprises the steps of
measuring a first empty pressure by the pressure sensor (9), during a first empty movement of the lifting device without the load creating a first empty output signal, measuring a second empty pressure by the pressure sensor (9), during a second empty movement of the lifting device without the load creating a second empty output signal, comparing the first and the second empty output signals, calculating the mass of the lifting device without the load based on the mean value of the first and the second empty output signals, if the first and the second empty output signals differ more than a second preset value, and calculating a second mass of the load by subtracting the mass of the lifting device without the load from the mass of the load calculated in clause 11.

13. A method according to clause 11 or 12 wherein the method further comprises the steps of sending a first signal from a first positioning sensor (14a,14b) to the processor (8) when the lifting device passes a first preset position prior to the measurement of the first pressure or the first empty pressure, and sending a second signal from a second positioning sensor (14a,14b) to the processor (8) when the lifting device passes a second preset position prior to the measurement of the second pressure or the second empty pressure.

14. A hydraulic fluid system comprising the hydraulic mass-determining system according to any of the clauses 1 to 10.

15. A forklift comprising the hydraulic mass-determining system according to any of the clauses 1 to 10.

16. Use of the forklift according to clause 15 for determining the mass of a load placed on the lifting device.

The invention claimed is:

1. A hydraulic mass determining system arranged for determining the mass of a load displaced by a hydraulic fluid system, whereby the hydraulic mass-determining system is adapted to be connected to a hydraulic fluid system between a hydraulic activator and a lifting device, the hydraulic mass determining system comprises at least one pressure sensor (9) for measuring the pressure in the hydraulic fluid system, where the at least one pressure sensor is connected to a processor (8), wherein the processor (8) is arranged for comparing two pressure signals from the pressure sensor (9) corresponding to a first measurement of a first movement and a second measurement of a second movement, respectively, and for calculating the mass of the load based on the mean value of the two pressure signals, if the value of the two pressure signals differ more than a preset value.

2. A hydraulic mass-determining system according to claim 1, wherein the processor (8) is arranged for interrupting the mass determination of the load if the two pressure signals do not differ more than a preset value.

3. A hydraulic mass-determining system according to claim 1, characterized in that, the lifting device comprises at least one single acting lifting cylinder (3).

4. A hydraulic mass-determining system according to claim 1, wherein hydraulic mass-determining system comprises a bi-directional flow controller (43) for regulating the flow of a fluid through the mass-determining system at a constant speed.

5. A hydraulic mass-determining system according to claim 4, wherein the bi-directional flow controller (43) is positioned between the hydraulic activator and the pressure sensor (9).

6. A hydraulic mass-determining system according to claim 4, wherein a first (5) and a second (6) pipe are mounted between the hydraulic activator and the lifting device, whereby the second pipe (6) is parallel with the first pipe (5), where the first pipe comprises the bi-directional flow controller (43), and where the second pipe comprises a valve (7) for blocking the flow through the second pipe when determining the mass of the load.

7. A hydraulic mass-determining system according to claim 6, wherein the at least one pressure sensor (9) is connected to the first pipe (5) between the bi-directional flow controller (43) and the lifting device.

8. A hydraulic mass-determining system according to claim 3, wherein the processor (8) is arranged for determining the mass of the load using the formula $$m = \frac{A((p_1 + p_2) - (p_{01} + p_{02}))}{2g}$$

where g is the standard gravity 9.81 m/s2,

A is the cross-sectional surface area of the piston (3a) in the single acting lifting cylinder (3), p1 and p2 are the two pressure signals with the load on the lifting device, and p01 and p02 are the two pressure signals with the empty lifting device.

9. A hydraulic mass-determining system according to claim 1, wherein a tilt-sensor is connected to the processor (8) and is arranged for measuring a tilt angle of the lifting device and for sending a tilt angle signal to the processor enabling the processor to compensate for the tilt angle when calculating the mass of the load.

10. A hydraulic mass-determining system according to claim 1, wherein the hydraulic mass-determining system is arranged for receiving a signal from a positioning component (14a, 14b) when the lifting device passes a preset position.

11. A method for determining the mass of a load using the hydraulic mass-determining system according to claim 1, wherein said hydraulic mass-determining system is connected to a hydraulic fluid system between a hydraulic activator and a lifting device wherein the method comprises the steps of placing a load, which mass is to be determined, on or in the lifting device, measuring a first pressure by the pressure sensor (9), during a first movement of the lifting device with the load creating a first output signal, measuring a second pressure by the pressure sensor (9), during a second movement of the lifting device with the load creating a second output signal, comparing the first and the second output signals, and calculating the mass of the load based on the mean value of the first and the second output signals, if the first and the second output signals differ more than a preset value.

12. A method according to claim 11, wherein the method comprises the steps of measuring a first empty pressure by the pressure sensor (9), during a first empty movement of the lifting device without the load creating a first empty output signal, measuring a second empty pressure by the pressure sensor (9), during a second empty movement of the lifting device without the load creating a second empty output signal, comparing the first and the second empty output signals, calculating the mass of the lifting device without the load based on the mean value of the first and the second empty output signals, if the first and the second empty output signals differ more than a second preset value, and calculating a second mass of the load by subtracting the mass of the lifting device without the load from the mass of the load calculated in claim 11.

13. A method according to claim 11, wherein the method further comprises the steps of sending a first signal from a first positioning sensor (14a, 14b) to the processor (8) when the lifting device passes a first preset position prior to the measurement of the first pressure or the first empty pressure, and sending a second signal from a second positioning sensor (14a, 14b) to the processor (8) when the lifting device passes a second preset position prior to the measurement of the second pressure or the second empty pressure.

14. A hydraulic fluid system comprising a hydraulic mass-determining system, the hydraulic mass-determining system arranged for determining the mass of a load displaced by a hydraulic fluid system, whereby the hydraulic mass-determining system is adapted to be connected to a hydraulic fluid system between a hydraulic activator and a lifting device, the hydraulic mass determining system comprises at least one pressure sensor (9) for measuring the pressure in the hydraulic fluid system, where the at least one pressure sensor is connected to a processor (8), wherein the processor (8) is arranged for comparing two pressure signals from the pressure sensor (9) corresponding to a first measurement of a first movement and a second measurement of a second movement, respectively, and for calculating the mass of the load based on the mean value of the two pressure signals, if the value of the two pressure signals differ more than a preset value.

15. A forklift comprising a hydraulic mass-determining system, the hydraulic mass-determining system arranged for determining the mass of a load displaced by a hydraulic fluid system, whereby the hydraulic mass-determining system is adapted to be connected to a hydraulic fluid system between a hydraulic activator and a lifting device, the hydraulic mass determining system comprises at least one pressure sensor (9) for measuring the pressure in the hydraulic fluid system, where the at least one pressure sensor is connected to a processor (8), wherein the processor (8) is arranged for comparing two pressure signals from the pressure sensor (9) corresponding to a first measurement of a first movement and a second measurement of a second movement, respectively, and for calculating the mass of the load based on the mean value of the two pressure signals, if the value of the two pressure signals differ more than a preset value.

* * * * *

UNITED STATES PATENT AND TRADEMARK OFFICE
CERTIFICATE OF CORRECTION

| | |
|---|---|
| PATENT NO. | : 11,237,037 B2 |
| APPLICATION NO. | : 17/368491 |
| DATED | : February 1, 2022 |
| INVENTOR(S) | : Knud-Erik Larsen and Robert Servaas Matti |

It is certified that error appears in the above-identified patent and that said Letters Patent is hereby corrected as shown below:

On the Title Page

Column 1, under (30) Foreign Application Priority Date:
"Sep. 22, 2017 (NL)..............2019608.0"
Should read:
--Sep. 22, 2017 (NL)..............2019608--

Signed and Sealed this
Twenty-sixth Day of April, 2022

Katherine Kelly Vidal
*Director of the United States Patent and Trademark Office*